(12) United States Patent
Cooper et al.

(10) Patent No.: US 11,904,419 B2
(45) Date of Patent: Feb. 20, 2024

(54) GAS METAL ARC WELDING SYSTEM FOR A WELDING ROBOTIC ARM

(71) Applicant: ELCo Enterprises, Inc., Jackson, MI (US)

(72) Inventors: Edward L. Cooper, Clarklake, MI (US); Steven J. Hayes, Addison, MI (US)

(73) Assignee: ELCo Enterprises, Inc., Jackson, MI (US)

( * ) Notice: Subject to any disclaimer, the term of this patent is extended or adjusted under 35 U.S.C. 154(b) by 611 days.

(21) Appl. No.: 17/255,705

(22) PCT Filed: Jun. 24, 2019

(86) PCT No.: PCT/US2019/038689
§ 371 (c)(1),
(2) Date: Dec. 23, 2020

(87) PCT Pub. No.: WO2020/005813
PCT Pub. Date: Jan. 2, 2020

(65) Prior Publication Data
US 2021/0276116 A1 Sep. 9, 2021

Related U.S. Application Data

(60) Provisional application No. 62/689,496, filed on Jun. 25, 2018.

(51) Int. Cl.
*B23K 9/29* (2006.01)
*B23K 9/12* (2006.01)
(Continued)

(52) U.S. Cl.
CPC .............. *B23K 9/295* (2013.01); *B23K 9/123* (2013.01); *B23K 9/133* (2013.01); *H01R 4/029* (2013.01); *H01R 9/11* (2013.01)

(58) Field of Classification Search
CPC ........ B23K 9/295; B23K 9/123; B23K 9/133; B23K 9/323
See application file for complete search history.

(56) References Cited

U.S. PATENT DOCUMENTS 2,444,767 A 7/1948 Cobean
3,007,032 A 10/1961 Whiteman
(Continued)

FOREIGN PATENT DOCUMENTS

DE 202017103567 U1 * 8/2017
FR 2886186 A1 * 12/2006 ............. B23K 9/287
KR 20120090321 A * 8/2012

OTHER PUBLICATIONS

Machine translation of FR 2886186 A1, Sep. 2023 (Year: 2023).*
(Continued)

*Primary Examiner* — Geoffrey S Evans
(74) *Attorney, Agent, or Firm* — Dickinson Wright PLLC

(57) ABSTRACT

A gas metal arc welding system for a robotic arm includes a j-arm, a power block, and a bolt. The j-arm has a first end and a second end each having a through hole. The power block has a first opening defining a first passageway along a longitudinal axis and a second opening defining a second passageway substantially along an axis perpendicular to the longitudinal axis. The bolt has a threaded portion configured to extend through the first opening of the j-arm and into the second passageway of the power block, wherein the bolt retains the j-arm to the power block. The threaded portion of the bolt comprises an internal passageway that extends through a longitudinal axis of the bolt, wherein the internal passageway of the bolt and the first and second passageways of the power block are in fluid communication with each other.

20 Claims, 5 Drawing Sheets

(51) Int. Cl.
*B23K 9/133* (2006.01)
*H01R 4/02* (2006.01)
*H01R 9/11* (2006.01)

(56) References Cited

U.S. PATENT DOCUMENTS

| | | |
|---|---|---|
| 4,942,281 A | 7/1990 | Srba |
| 5,866,874 A | 2/1999 | Haczynski et al. |
| 6,346,751 B1 | 2/2002 | Delfino et al. |
| 2006/0169685 A1 | 8/2006 | Stanzel |
| 2006/0226132 A1 | 10/2006 | Giese |
| 2007/0102410 A1 | 5/2007 | Zamuner |

OTHER PUBLICATIONS

Machine translation of DE 202017103567 U1, Sep. 2023 (Year: 2023).*

Machine translation of KR 20120090321 A, Sep. 2023 (Year: 2023).*

* cited by examiner

US 11,904,419 B2

GAS METAL ARC WELDING SYSTEM FOR A WELDING ROBOTIC ARM

CROSS RELATED APPLICATIONS

This application is a 371 National Stage Application of PCT International Patent Application No. PCT/US2019/038689, filed Jun. 24, 2019, which claims the benefit of U.S. Provisional Patent Application No. 62/689,496 filed Jun. 25, 2018, the content of which is hereby incorporated by reference in its entirety.

BACKGROUND

1. Field of the Invention

The present invention generally relates to gas metal arc welding systems and more particularly to gas metal arc welding systems incorporated within a robotic arm.

2. Description of Related Art

Metal Inert Gas (MIG) welding also referred to as "wire-feed" or Gas Metal Arc Welding (GMAW) utilizes heat from an electrical arc to melt a consumable electrode to form a weld on a workpiece. A MIG welding system typically includes a power supply, a gas supply, and an electrode supply connected to a welding device or welding gun. A ground cable is used to connect the workpiece to the power supply. The welding device generally includes a handle, a gooseneck, and an end assembly.

The welding system can be automatic or semi-automatic and may be manually or robotically controlled. The electrode and gas are coupled through a conduit in the handle and the gooseneck to the end assembly of the welding device. The electrode extends through the contact tip of the end assembly, and the gas moves around the contact tip in the nozzle of the end assembly. When the welding device is activated, the electrode is fed through the contact tip toward the workpiece and the gas is directed through the nozzle towards the workpiece. When the electrode is placed adjacent or in contact with the workpiece, the electrode completes an electrical circuit between the power supply and the workpiece allowing current to flow through the electrode to the workpiece. The current produces an arc between the electrode and the workpiece.

The heat of the arc melts the electrode and the workpiece in the region surrounding the arc creating a weld puddle. The gas flowing out the nozzle shields the weld puddle from outside contaminants. The type of gas used in MIG welding varies depending on many factors. Noble or inert gases such as Argon are often used. However, Carbon Dioxide ($CO_2$) and a mixture of gases such as $CO_2$ and Argon are also used. Once the electrode is moved away from the workpiece, the electric circuit is broken, and the weld puddle cools and solidifies forming a weld.

SUMMARY

A gas metal arc welding system for a robotic arm includes a j-arm, a power block, and a bolt. The j-arm has a first end and a second end each having a through hole. The power block has a first opening defining a first passageway along a longitudinal axis and a second opening defining a second passageway substantially along an axis perpendicular to the longitudinal axis. The bolt has a threaded portion configured to extend through the first opening of the j-arm and into the second passageway of the power block, wherein the bolt retains the j-arm to the power block. The threaded portion of the bolt comprises an internal passageway that extends through a longitudinal axis of the bolt, wherein the internal passageway of the bolt and the first and second passageways of the power block are in fluid communication with each other.

Further objects, features, and advantages of this invention will become readily apparent to persons skilled in the art after a review of the following description, with reference to the drawings and claims that are appended to and form a part of this specification.

DETAILED DESCRIPTION

Figure 1:
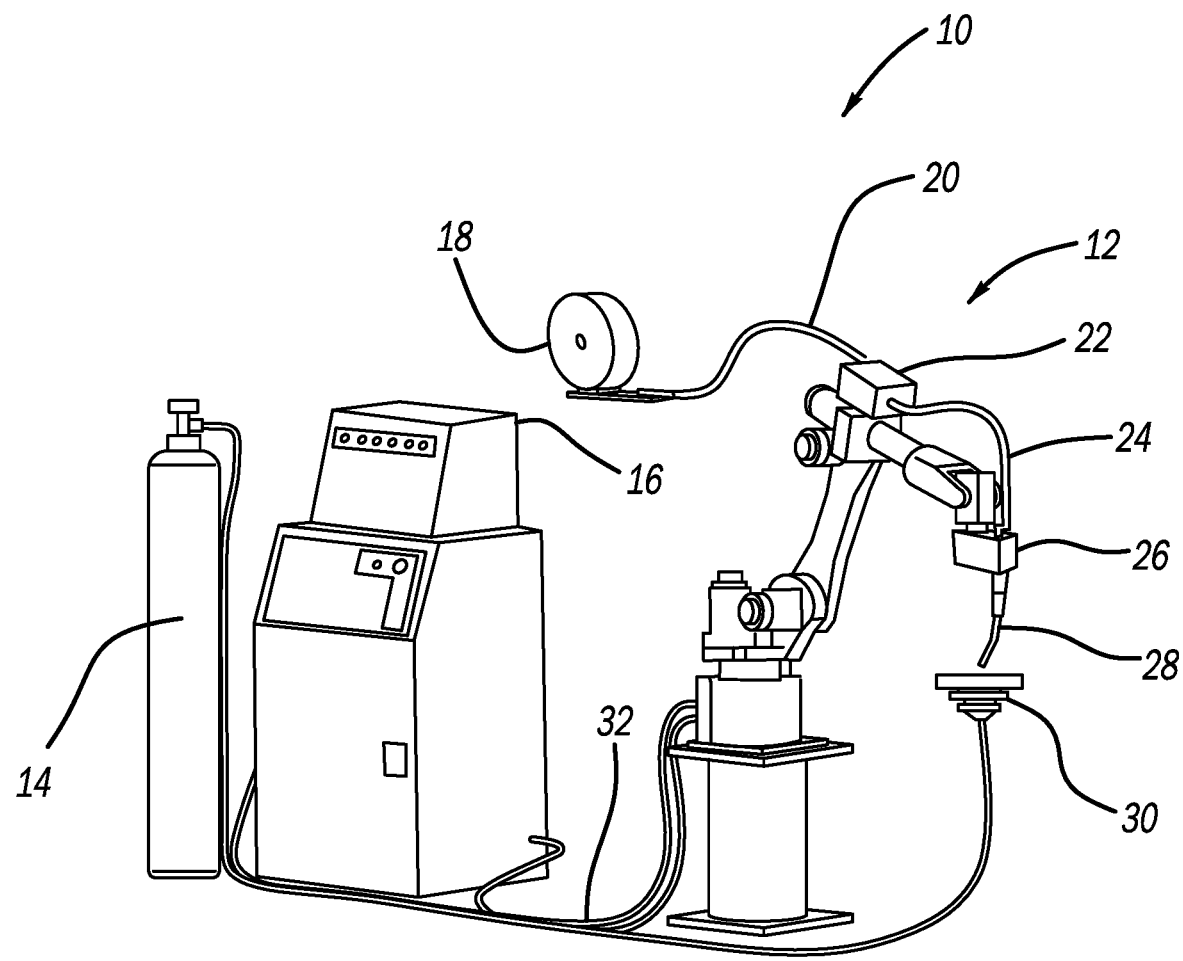
FIG. 1 illustrates a robotic arm utilizing the gas metal arc welding system.
Figure 2A:
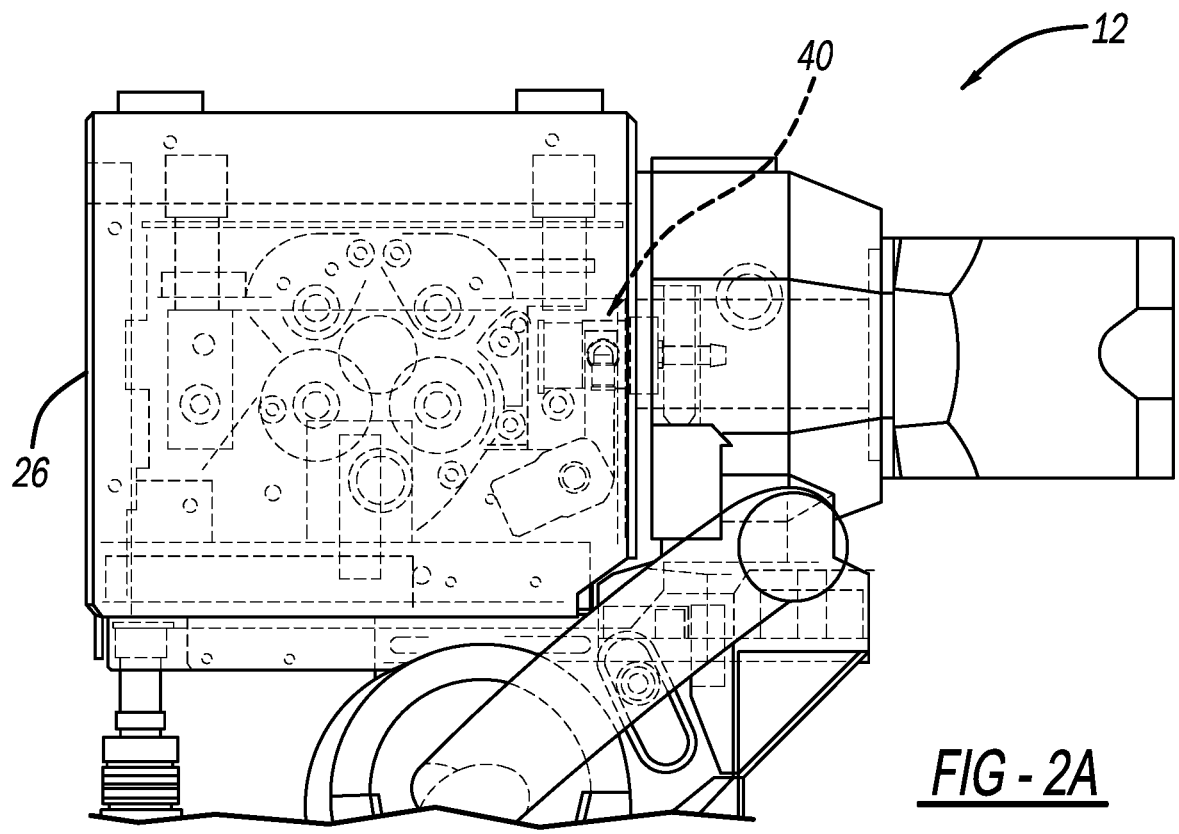
FIG. 2A-2D illustrates a more detailed view of the gas metal arc welding system Inc. within the robotic arm.
Figure 2B:
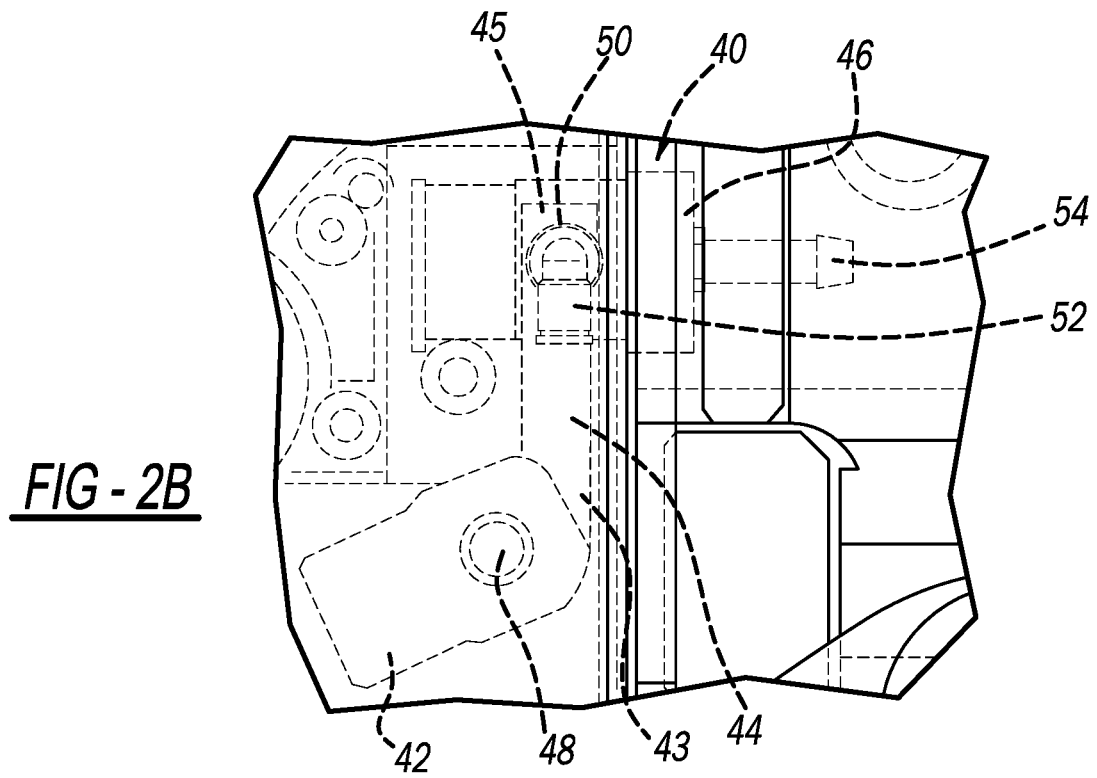
Figure 2C:
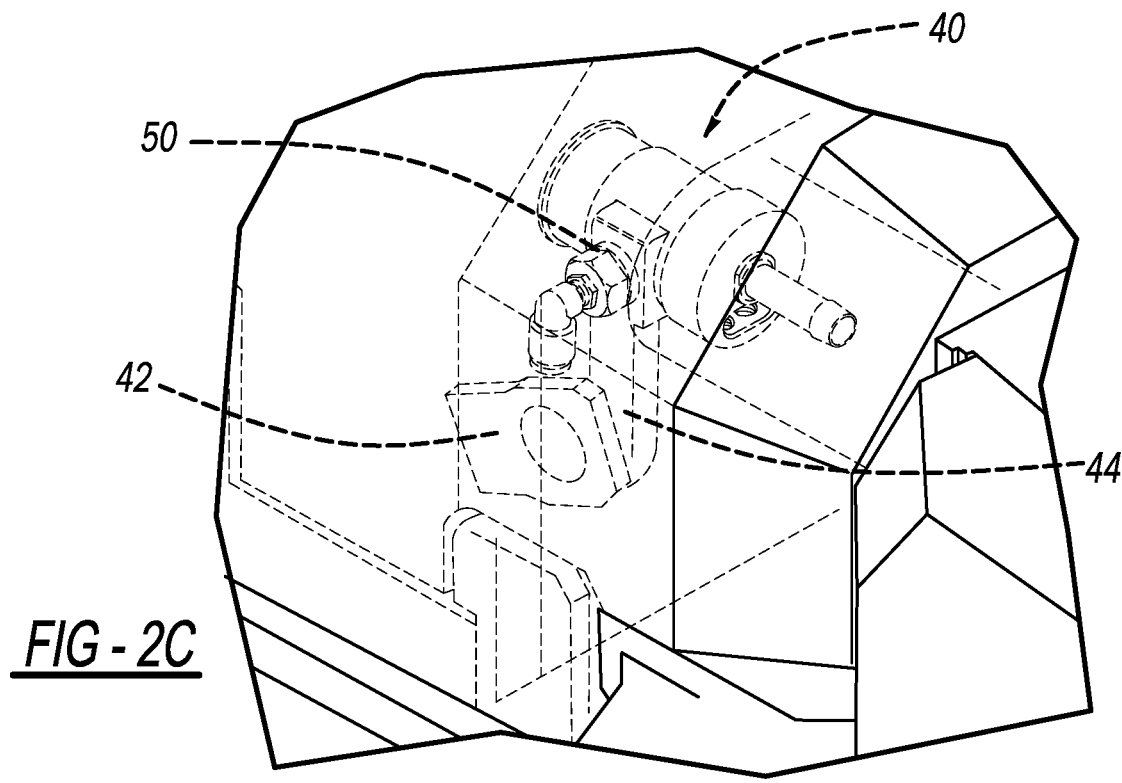
Figure 2D:
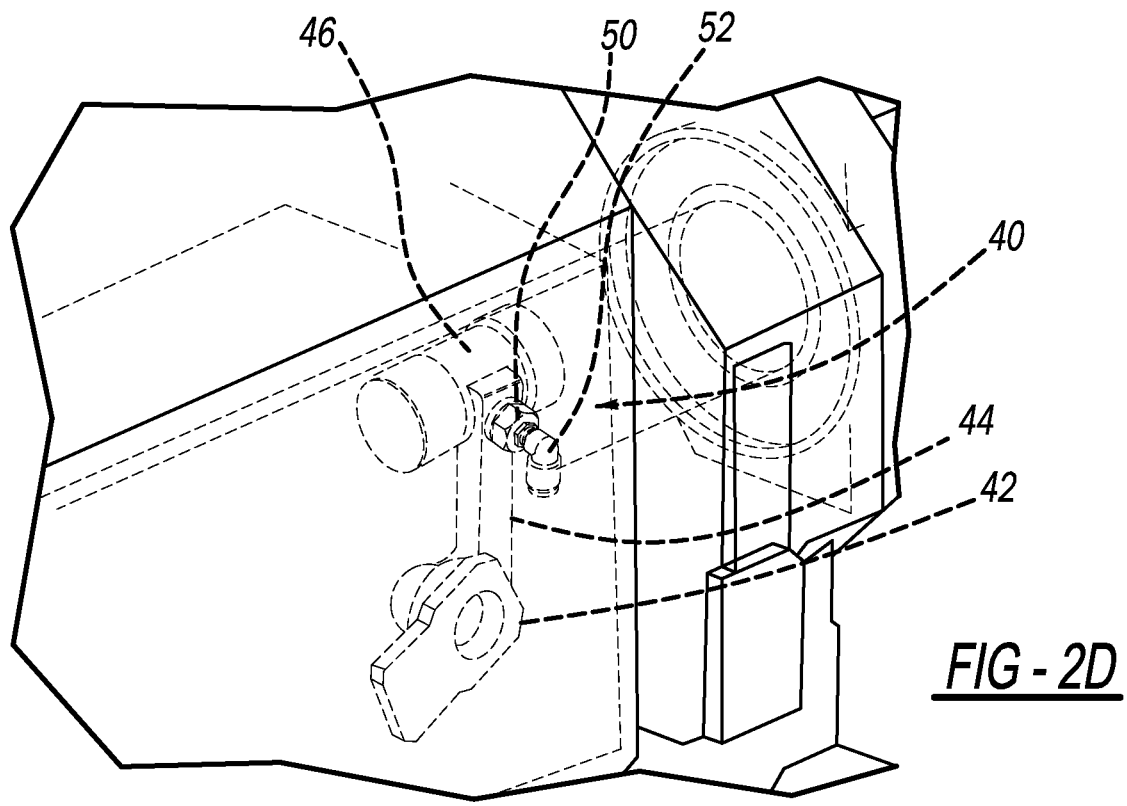
Figure 3:
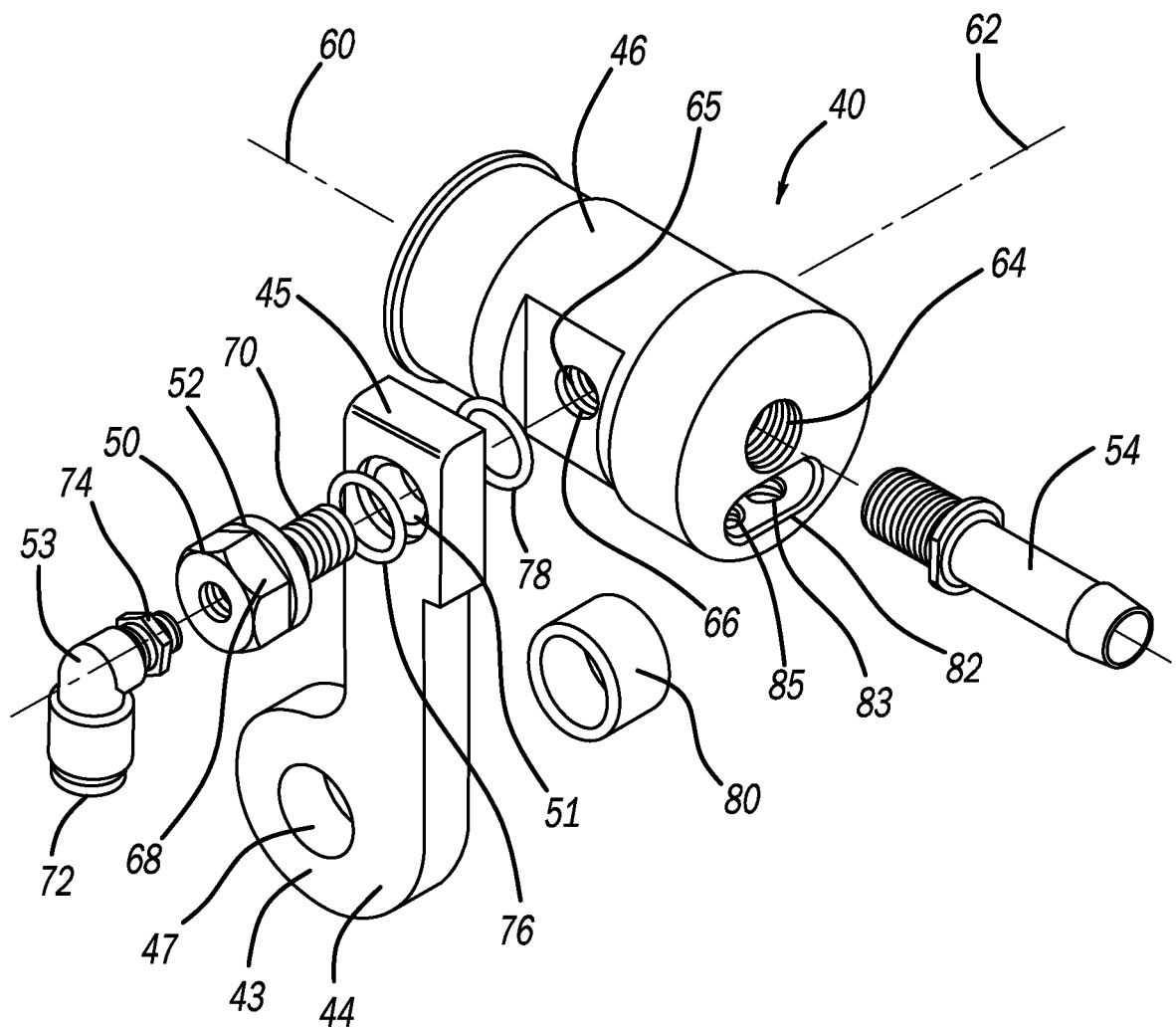
FIG. 3 illustrates an exploded view of the gas metal arc welding system.

Referring to FIG. 1, a robotic arm system 10 is shown. The robotic arm system 10 may include a robotic arm assembly 12. Generally, the robotic arm assembly includes a torch end 28 and a drive box 26. A utility cable 24 may be provided so as to feed a wire acting as an electrode into the drive box 26. This wire essentially acts as an electrode for the gas metal arc welding process. The robotic arm assembly 12 also includes a utility junction box 22 that is configured to receive the wire acting as an electrode from the welding wire spool 18. Wire from the welding wire spool 18 is fed into the utility junction box 22 via an insulated wire conduit 20.

A digital weld power supply 16 provides power to the robotic arm assembly 12 using one or more connection cables 32. A gas supply 14 provides inert gas to be utilized by the robotic arm assembly 12 when performing a gas metal arc welding operation.

Referring to FIGS. 2A-2D a more detailed view of the gas metal arc welding system 40 incorporated within the robotic arm assembly 12 is shown. Generally, the gas metal arc welding system 40 includes a lug 42, a j-arm and a power block 46. The lug 42 is connected to a first end 43 of the j-arm 44 using a bolt assembly. The j-arm 44 and the lug 42 are generally made of a highly conductive material, such as copper, so as to provide the free flow of electricity to perform the gas metal arc welding operation. The other end of the j-arm 44 has a second end 45. The second end 45 is configured to attach to the power block 46 using a bolt 50. The bolt 50 has a threaded end that threads through an opening located within the second end of the j-arm 44. The power block 46 also has a threaded portion that allows it to mate with the bolt 50 so as to attach the second end 45 of the j-arm 44 to the power block 46.

In some implementations, one or all of the of lug 42, j-arm 44, the bolt 50, power block 46 and the nozzle 54 may be made of a highly conductive material, for example copper, and may be made of the same material for improved electrical transmission characteristics. In some implementations, a series of the lug 42, j-arm 44, the bolt 50, power block 46 and the nozzle 54 (e.g. the lug 42 and j-arm 44, or the lug 42, j-arm 44, power block 46, and nozzle 54) may be made of a highly conductive material, for example copper, and may be made of the same material for improved electrical transmission characteristics.

In order to better illustrate the parts of the gas metal arc welding system 40, an exploded view of the gas metal arc welding system 40 is shown. As stated before, here, the gas metal arc welding system includes a j-arm 44 having a first end 43 and a second end 45. The first end 43 of the j-arm defines a substantially circular opening 47 within the j-arm 44. The substantially circular opening 47 generally extends through the depth of the j-arm 44. The substantially circular opening 47 is configured so as to mate with the lug 42 (as shown in FIGS. 2A-2D). This type of mating may occur through the use of a power ball type technology, wherein the lug is shaped slightly spherical so as to mate with a slightly spherical opening 47 of the first end 43 of the j-arm.

The second end 45 of the j-arm 44 also has an opening 51 that extends through the depth of the second end 45 of the j-arm 44. Here, the bolt 50 is configured so as to extend through the opening 51 of the second end 45 of the j-arm 44 and attached to a threaded portion 66 of the power block 46. The bolt 50 has a head 52 that has a diameter such that it clamps the j-arm 44 to the power block 46 when the threaded portion 70 of the bolt 50 is screwed into the threaded portion 66 of the power block 46.

The bolt 50 generally has a longitudinal diameter and a passageway through the entire length of the longitudinal diameter. The reason for this internal passageway is to allow the flow of an inert gas into the power block 46 as will be described later. The inert gas is provided to the bolt 50 via the use of a coupling 53 having an input 72 for receiving the inert gas from the gas supply. This inert gas travels through the length of the bolt 50 and into the power block 46.

Referring to the power block 46, the power block 46 generally has a longitudinal axis 60. The longitudinal axis 60 generally defines a first passageway that extends through the length of the power block 46 along the longitudinal axis 60. Running substantially perpendicular to this passageway 64 is a second passageway 65 containing the threaded portion 66. The second passageway 65 runs substantially perpendicular to the axis 60 generally along axis 62. The passageway 65 is in fluid communication with the passageway 64. As such, the passageway 64, 65, and 68 through the bolt 50 are each in fluid communication with each other. As such, inert gas provided to the bolt 50 by the coupling 53 will be essentially provided to the second passageway 65 as well as the first passageway 64. A nozzle end 54 can then be attached to the first passageway 64. Both the wire and the inert gas would be fed through the nozzle 54 and to the torch end 28 shown in FIG. 1. One or more O-rings 76 and/or 78 may be utilized so as to attach and create a tight seal between the bolt 50, j-arm 44, and power block 46. Additionally, a larger O-ring 80 may be utilized so as to attach the first end 43 to the lug shown in FIGS. 2A-2D.

When thusly assembled, electricity can be provided to the electrode through the j-arm 44 and the power block 46 that the j-arm 44 receives from the lug 42 shown in FIGS. 2A-2D. Additionally, the inert gas can then be provided the j-arm 44 and into the power block 46.

The power block 46 may also include an elongated cavity that is configured to receive a cable that will be described in FIGS. 4A-4C. The cavity 82 may take any shape but should be configured so as to have the ability to receive an end of a cable. The cavity 82 may also include threaded portions 83 and 85 for receiving set screws so as to retain any cable inserted within the cavity 82 in direct and electrical contact with the power block 46. The cable that is inserted into the cavity 82 essentially provides electricity to the torch end 28 of the robotic arm assembly 12.

Figure 4A:
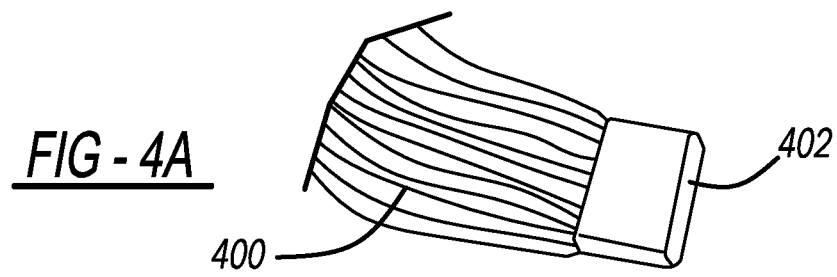
FIGS. 4A-4C illustrate a multistranded cable having consolidated ends that may be utilized with the gas metal arc welding system.
Figure 4B:
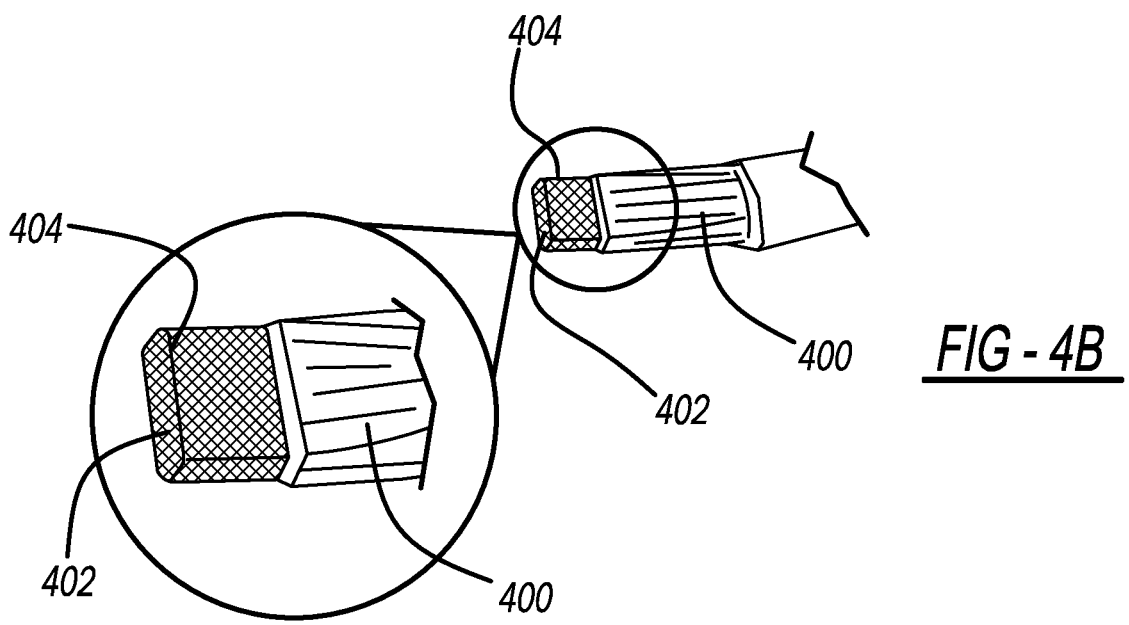

As for the cable to be inserted into the cavity 82, references made to FIGS. 4A-4B that illustrate a cable 400.

Figure 4C:
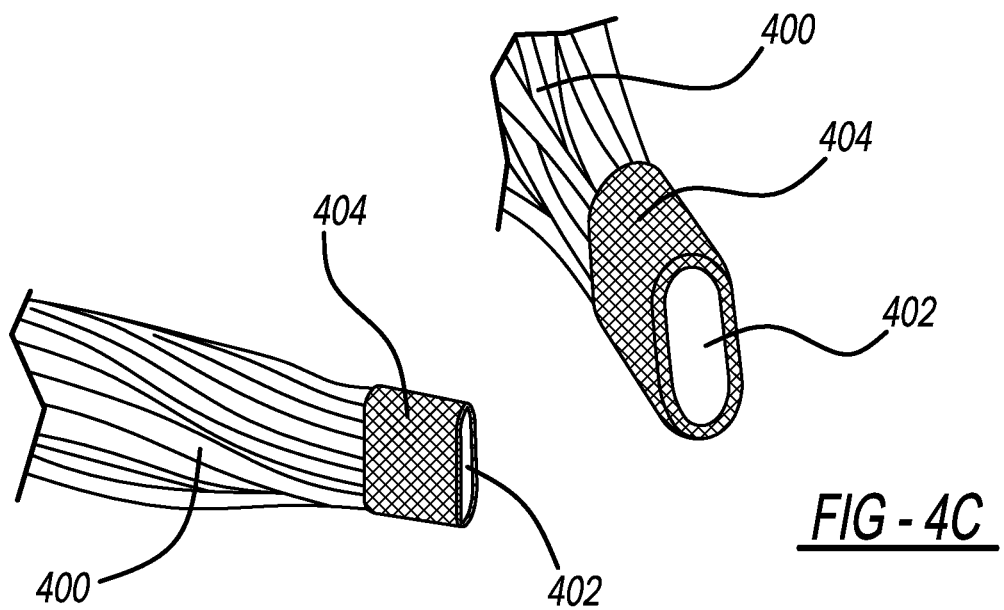

Referring to FIGS. 4A-4C, the cable 400 may be any type of conductive wire but generally is a multi-stranded copper wire. The cable 400 has at least one terminal end 402. The strands of the cable 400 at the terminal end 402 may be consolidated with each other via the use of the welding process. This welding process may be an ultrasonic welding process that welds the terminal end 402 of the cable 400.

The shape of the welded terminal end 402 may take any one of a number of different shapes. For example, the shape of the terminal end 402 after welding may be a cube, cuboid, triangular prism, pentagonal prism, hexagonal prism, cylinder, and the like. Again, it should be understood that any type of shape could be utilized. Furthermore, the shape of the terminal end 402 may have edges that are either sharp or rounded.

With a further focus on FIG. 4C, the terminal end 402 of the cable 400 may also include a cap 404 that mates with the terminal end 402 of the cable 400. The cap 404 is generally made of a conductive material, such as copper. As such, the cap 404 may be made of the same material as the cable 400. The cap 404 receives the terminal end 402 of the cable 400. The cap 404 may be welded to the terminal end 402 during the same ultrasonic welding step utilized to consolidate the terminal end 402 of the cable 400 or may be welded in a two-step process, wherein the terminal end 402 is consolidated together using an ultrasonic welding process and then the cap 404 is then welded in a second ultrasonic welding process to the consolidated end 402 of the cable 400. Furthermore, the cap 404 may first be crimped using a crimping operation to the terminal end 402 before ultrasonic welding of the cap 404 to the terminal end 402 occurs.

The cap 404 can take any one of a number of different shapes. As such, the cap 404 may be a cube, cuboid, triangular prism, pentagonal prism, hexagonal prism, cylinder, and the like. Furthermore, as shown in FIG. 4C, the cap 404 may be an open-ended cap 404. As such, the terminal end 402 may have a portion that extends through the length of the cap 404.

As a person skilled in the art will readily appreciate, the above description is meant as an illustration of an implementation of the principles of this invention. This description is not intended to limit the scope or application of this invention in that the invention is susceptible to modification, variation, and change, without departing from the spirit of this invention, as defined in the following claims.

The invention claimed is:

1. A gas metal arc welding system for a robotic arm, the system comprising:
   a j-arm having a first end and a second end, both the first and second ends each having a through hole;
   a power block having a longitudinal axis, the power block having a first opening defining a first passageway along the longitudinal axis and a second opening defining a second passageway substantially along an axis perpendicular to the longitudinal axis, wherein the first and second passageways are in fluid communication with each other, wherein the first passageway is configured to receive an electrode;
   a bolt having a threaded portion configured to extend through the first end of the j-arm and into the second passageway of the power block, wherein the bolt retains the j-arm to the power block;

wherein the threaded portion of the bolt comprises an internal passageway that extends through a longitudinal axis of the bolt, wherein the internal passageway of the bolt, and the first and second passageways of the power block are in fluid communication with each other; and wherein the bolt has a head located adjacent to the first end of the j-arm, opposite of the power block, the internal passageway of the bolt extending through the head, wherein an inert gas is fed through the internal passageway of the bolt.

2. The system of claim 1, further comprising a lug in electrical communication with the second end of the j-arm.

3. The system of claim 2, further comprising a multi-stranded wire having a terminal end, wherein the terminal end is in electrical communication with the lug, and the terminal end of the multi-stranded wire is consolidated via an ultrasonic welding process.

4. The system of claim 1, wherein the power block further comprises an elongated cavity that is substantially parallel to the first passageway.

5. The system of claim 4, further comprising a multi-stranded wire having a terminal end, wherein the terminal end is in electrical communication with the power block, the terminal end of the multi-stranded wire is consolidated via an ultrasonic welding process and is inserted into the elongated cavity.

6. A gas metal arc welding system for a robotic arm, the system comprising:
an arm having a first end and a second end, both the first and second ends each having a through hole;
a power block having a longitudinal axis, the power block having a first opening defining a first passageway along the longitudinal axis, wherein the first passageway is configured to receive an electrode;
a bolt having a threaded portion configured to extend through the first end of the arm and into the power block, wherein the bolt retains the arm to the power block;
a lug attached to the second end of the arm, the lug and the arm being formed of a same highly conductive material and configured to conduct electricity to the power block.

7. The system of claim 6, wherein the arm is a j-arm.

8. The system of claim 6, wherein the arm and the lug are copper.

9. The system of claim 6, further comprising a multi-stranded wire having a terminal end, wherein the terminal end is in electrical communication with the lug, and the terminal end of the multi-stranded wire is consolidated via an ultrasonic welding process.

10. The system of claim 6, further comprising a multi-stranded wire having a terminal end, wherein the terminal end is in electrical communication with the power block, and the terminal end of the multi-stranded wire is consolidated via an ultrasonic welding process and is inserted into an elongated cavity defined by the power block.

11. The system of claim 6, further comprising a second opening defining a second passageway substantially along an axis perpendicular to the longitudinal axis, wherein the first and second passageways are in fluid communication with each other.

12. The system of claim 11, wherein the threaded portion of the bolt comprises an internal passageway that extends through a longitudinal axis of the bolt, wherein the internal passageway of the bolt and the first and second passageways of the power block are in fluid communication with each other.

13. The system of claim 12, wherein the bolt has a head located adjacent to the first end of the arm, opposite of the power block, the internal passageway of the bolt extending through the head, wherein an inert gas is fed through the internal passageway of the bolt.

14. The system of claim 13, wherein the power block further comprises an elongated cavity that is substantially parallel to the first passageway.

15. A system for providing power to a welding system, the system comprising:
a power block having a longitudinal axis, the power block having a first opening defining a first passageway along the longitudinal axis and a second opening defining a second passageway substantially along an axis perpendicular to the longitudinal axis, wherein the first and second passageways are in fluid communication and define an internal passageway;
wherein the internal passageway is configured for feeding inert gases therethrough;
wherein the first passageway is configured to receive an electrode;
an arm member fixed to the power block;
a multi-stranded cable having a consolidated end, wherein the consolidated end is consolidated via ultrasonic welding, wherein the consolidated end is in conductive contact directly with the power block or indirectly via the arm member.

16. The system of claim 15, further comprising a lug directly attached to the arm member, wherein the consolidated end of the cable is in conductive contact with the lug.

17. The system of claim 15, further comprising a lug, wherein the lug includes a spherical portion in direct contact with a spherical opening of the arm member.

18. The system of claim 15, further comprising a cavity defined by the power block, wherein the consolidated end is received and secured in the cavity.

19. The system of claim 15, wherein the multi-stranded cable includes a cap surrounding the consolidated end.

20. The system of claim 19, wherein the cap is secured to the consolidated end via ultrasonic welding.

* * * * *